March 26, 1963     M. J. IRLAND ET AL     3,082,661
INTERFERENCE FILTER FOR USE IN A MOTOR VEHICLE
Original Filed Feb. 7, 1957
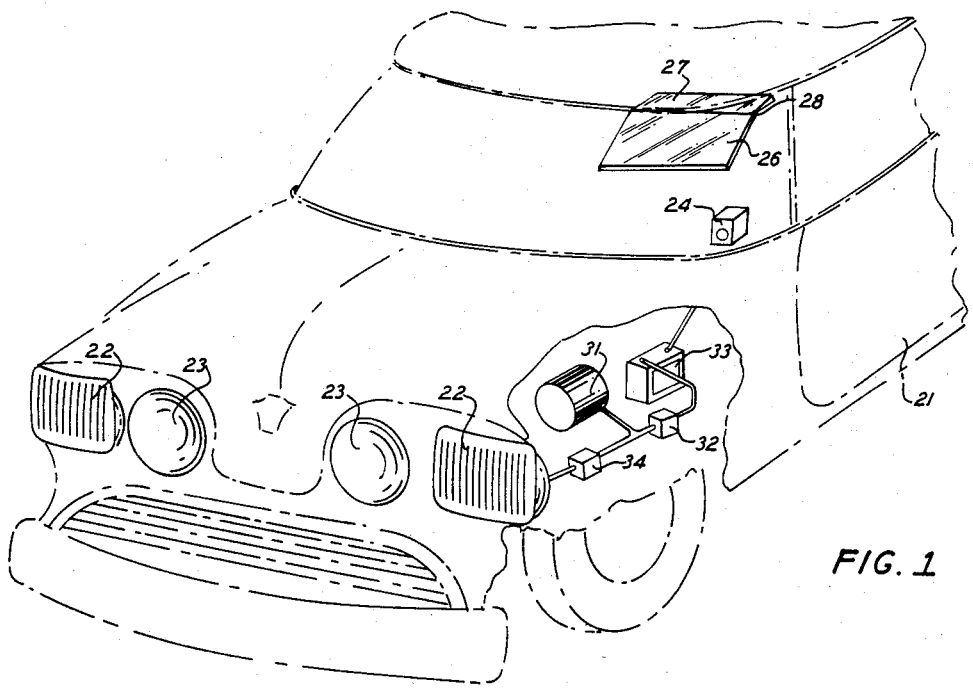
FIG. 1
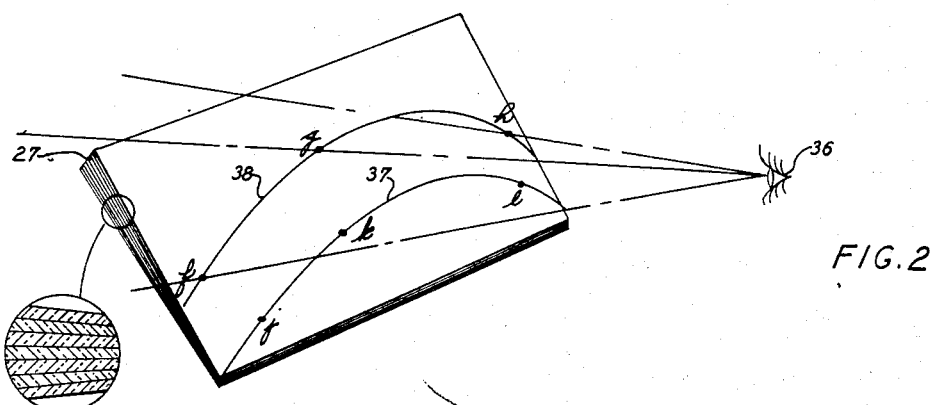
FIG. 2
FIG. 4
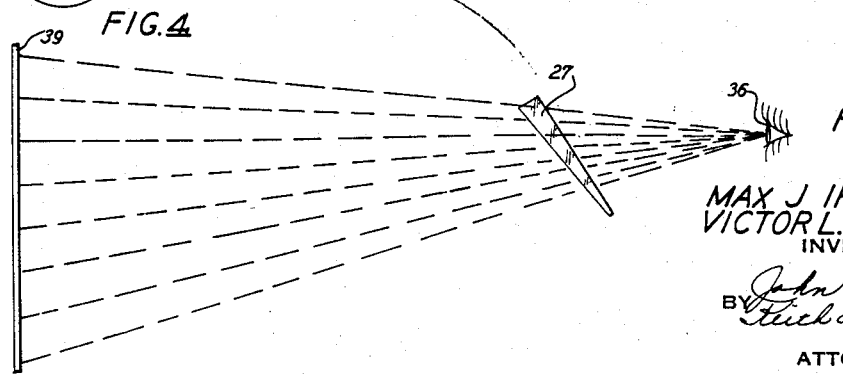
FIG. 3
MAX J IRLAND
VICTOR L. LINDBERG
INVENTORS
BY *John R. Faulkner*
*Fred L. Berschling*
ATTORNEYS

United States Patent Office 3,082,661
Patented Mar. 26, 1963

3,082,661
INTERFERENCE FILTER FOR USE IN A
MOTOR VEHICLE
Max J. Irland, Dearborn, and Victor L. Lindberg, Northville, Mich., assignors to Ford Motor Company, Dearborn, Mich., a corporation of Delaware
Original application Feb. 7, 1957, Ser. No. 638,752, now Patent No. 2,927,245, dated Mar. 1, 1960. Divided and this application Dec. 30, 1959, Ser. No. 862,917
4 Claims. (Cl. 88—1)

This invention relates to motor vehicle lighting systems and more particularly to an interference filter for use in a motor vehicle that has a proper variation over its surface of the thickness of each of its several layers to admit the maximum amount of the desired wave length to the driver's eye.

This application is a division of our co-pending application S.N. 638,752, filed February 7, 1957, that was issued as Patent 2,927,245 on March 1, 1960.

In the embodiment of the invention described below there is provided a set of headlights capable of emitting a powerful monochromatic polarized light to be used in conjunction with one, both, or neither of two unique filters provided depending upon the presence of oncoming motor vehicles and the type of headlamps with which said oncoming vehicles are equipped. If no vehicle is sensed by the assembly of this invention, no filter is placed before the driver's eyes. If an oncoming vehicle with similar equipment is sensed, then a polarized filter is automatically positioned in front of the driver's eyes, allowing him to see the light from his own headlights as reflected from the road and objects thereon and adjacent thereto, but blocking almost completely the light from the oncoming vehicle's headlights. If an oncoming motor vehicle is sensed with a lighting assembly other than one similar to the operator's, then a monochromatic filter is automatically positioned before the operator's eyes so that he may receive the reflected light from his own headlights while blocking all of the light from the oncoming vehicle except that portion in the narrow range passed by his filter. If both monochromatic and white light are sensed, then both filters will be placed before the driver's eyes. In addition to the monochromatic viewing filter used by the driver in the passenger compartment, a second monochromatic filter may be used in conjunction with the light source of this invention thereby insuring the emission of the desired band of wave lengths.

The driver's viewing filter used in the passenger compartment is inclined approximately 15 to 45 degrees to a vertical plane so that it will not reflect light from the rear or sides of the vehicle into the driver's eyes. This feature of the invention is described more completely in application S.N. 403,978, to Irland, now abandoned, and assigned to the assignee of this application. This viewing filter is advantageously a multilayer dielectric interference filter. Since the amount of a particular wave length of light passed by an interference filter varies with the angle of the light incident to the filter, this invention has provided a filter which has the proper variation over its surface of the thicknesses of each of its several layers to admit the maximum amount of the desired wave length to the driver's eye.

These and other objects will become more apparent when a detailed description of an embodiment of this invention is considered in which the following drawings are illustrative:

FIGURE 1 shows a perspective, partially cutaway vehicle equipped with an embodiment of this invention;

FIGURE 2 is a diagrammatic view showing the placement of the driver's interference filter along with an exaggerated cross section of the wedge-shaped characteristics of the layers of the filter;

FIGURE 3 is a schematic view showing approximate relative placements of the driver's eye, a filter and a viewed object with several lines of sight shown in dashed lines; and FIGURE 4 is an enlarged partial end view of the filter shown in FIGURE 2 and inscribed in the circle shown in FIGURE 2.

Shown in FIGURE 1 is automobile 21 having two sets of headlights, a polarized, filtered arc light set 22 and conventional incandescent light set 23 which may be placed inwardly thereof. Also shown are driver's filters 26 and 27 which are adjustably mounted within the passenger compartment so that the appropriate filter may be automatically positioned in the operator's line of vision if conditions require. As shown in the drawings these filters are adapted to be pivoted about a common axis 28; however, it is to be understood that any mechanical arrangement by which these filters may be precisely positioned in and removed from the driver's line of sight may be used. Filter 26 is a polarizing filter, while filter 27 is a monochromatic interference filter adapted to filter out all but a selected wave length from a mercury arc lamp. Sensing box 24 is positioned to receive light signals from oncoming vehicles and automatically selects and positions either filter 26, 27, both, or neither. In the cutaway portion is seen alternating current generator 31 which is connected through rectifier unit 32 to battery 33 which supplies direct current for the rest of the motor vehicle electrical circuit. Connected between generator 31 and lamp set 22, is current regulator 34. Sensor 24 is also connected to lamps 22 and upon receiving an oncoming light signal of a certain intensity, but without regard to the wave lengths, will automatically deflect the beams of headlight set 22 downwardly. In this embodiment headlight set 23 is intended for use only in town driving or when the vehicle's engine is stopped, while headlight set 22 may be manually switched into the circuit by the operator for highway driving. In this case, headlight set 23 will automatically continue to function until set 22 has reached substantially full brilliance, and will then be automatically switched off.

A mercury arc is ideally suited to be the light source for headlamp 22 because it heats up to operating temperatures relatively quickly and a large fraction of the luminous flux of this arc is concentrated in the vicinity of one wave length (5461 Angstroms) so that the light emitted by lamp 22 may be made monochromatic by employing a filter transparent at 5461 A.

A monochromatic interference filter 27 is shown in FIGURES 2 and 4 in which the variation in the thickness of the layers is greatly exaggerated. These layers are formed of dielectric material with alternate layers having a high index of refraction and a low index of refraction. It is a part of this invention to make all points which are equidistant from the operator's eyes as are the points on each of the arcs 37, 38 of equal thickness and to make this thickness for each arc so that wave lengths entering the filter will travel through the same optical thickness of the filter for optimum operation of the filter. With the filter tilted in the position shown in FIGURE 3, about 15 degrees from the vertical, it is seen that the line from the object 39 to the eye 36 is more nearly normal to filter 27 at the bottom than it is at the top. The filter layers are made physically thicker as the angle of incidence increases in order to allow the optical thickness of the filter to remain constant so that the maximum amount of the desired wave length, for example, 5461 Angstrom units, may be transmitted through the filter, thereby making objects most easily seen. This is because in an interference filter the phase shift of an impinging beam decreases as the angle of incidence increases and increasing the thickness of the layers of the filter will increase the phase shift. It should be kept in mind, however, that for best results points of equal thickness should be equidistant from the operator's eye. This means, of course, that the points of equal thickness should lie along the arcs of a circle on the plane of the filter. That is to say that at points $f$, $g$, and $h$ along arc 38, the thickness of the filter layers are the same and the thickness at points $j$, $k$, and $l$ along arc 37 are also equal but different from the thickness along arc 38.

It will be understood that the invention is not to be limited to the exact construction shown and described, but that various changes and modifications may be made without departing from the spirit and scope of the invention, as defined in the appended claims.

We claim:

1. An oblique interference filter for nonparallel light, said oblique interference filter positioned in an automotive vehicle in front of the normal position for the eyes of a motor vehicle operator with the top of the filter being positioned farther from the normal position for the operator's eyes than the bottom thereof, said oblique interference filter comprising a plurality of layers of dielectric material, alternate layers having a high index of refraction and a low index of refraction, each of said layers increasing in thickness radially from a point below the bottom edge of said filter and lying in the plane of said filter.

2. An oblique interference filter for nonparallel light, said filter being positioned in front of the normal position for the eyes of a motor vehicle operator with the top of the filter being positioned farther from the normal position for the operator's eyes than the bottom of the filter, said filter comprising a plurality of layers of dielectric material, alternate layers having a high index of refraction and a low index of refraction, each of said layers increasing in thickness radially from a point lying below the bottom edge of the filter.

3. An oblique interference filter for nonparallel light, said interference filter being positioned in front of the normal position for the eyes of a motor vehicle operator with the top of the filter being positioned farther from the normal position for the operator's eyes than the bottom of the filter, said interference filter comprising a plurality of layers of dielectric material, alternate layers having a high index of refraction and a low index of refraction, each of said layers increasing in thickness radially from a point lying below the bottom edge of said filter and in the plane of said filter, said point being positioned on a line which lies midway between the sides of said filter.

4. In a motor vehicle, an interference filter capable of rejecting substantially all visible light except one narrow band width, said interference filter being positioned in the motor vehicle operator's normal line of sight and oriented at a substantial angle to said line of sight with the top of said filter being positioned farther from the normal position of the operator's eyes than the bottom of said filter, said interference filter comprising alternate layers of material having a high index of refraction and a low index of refraction, each of said layers increasing in thickness radially from a point lying below the bottom edge of said filter and in the plane of said filter, said point being positioned on a line which lies midway between the sides of said filter.

References Cited in the file of this patent

UNITED STATES PATENTS

| | | |
|---|---|---|
| 1,992,188 | Chambers | Feb. 26, 1935 |
| 2,589,930 | Dimmick et al. | Mar. 18, 1952 |

FOREIGN PATENTS

| | | |
|---|---|---|
| 592,177 | Great Britain | Sept. 10, 1947 |